(12) United States Patent
Karvinen

(10) Patent No.: US 8,206,491 B2
(45) Date of Patent: Jun. 26, 2012

(54) APPARATUS FOR WATER SEPARATION IN THE VACUUM SYSTEM OF A PAPER MACHINE AND METHOD FOR UTILIZING THE SAME

(75) Inventor: Juha Karvinen, Siltakylä (FI)

(73) Assignee: Runtech Systems Oy, Kolho (FI)

( * ) Notice: Subject to any disclaimer, the term of this patent is extended or adjusted under 35 U.S.C. 154(b) by 224 days.

(21) Appl. No.: 12/784,244

(22) Filed: May 20, 2010

(65) Prior Publication Data

US 2011/0247497 A1 Oct. 13, 2011

(30) Foreign Application Priority Data

Apr. 9, 2010 (FI) .................................... 20105361

(51) Int. Cl.
*B01D 45/00* (2006.01)
(52) U.S. Cl. ............... 95/267; 95/272; 95/243; 95/262; 95/329; 95/355; 95/356; 95/360; 95/366; 55/315; 55/318; 55/462; 55/448; 55/355; 55/421; 55/424; 55/426
(58) Field of Classification Search .............. 55/315, 55/318, 462, 448, 355, 421, 424, 426; 96/243, 96/262, 329, 355, 356, 360, 366; 95/267, 95/272

See application file for complete search history.

(56) References Cited

U.S. PATENT DOCUMENTS

| | | | | |
|---|---|---|---|---|
| 2,239,595 A * | 4/1941 | Cummings, Jr. | ................ | 96/251 |
| 2,256,374 A * | 9/1941 | Cummings, Jr. | ................ | 95/216 |
| 3,006,436 A * | 10/1961 | Starbuck et al. | ................ | 96/300 |
| 3,997,303 A | 12/1976 | Newton | | |
| 4,157,250 A * | 6/1979 | Regehr et al. | ................... | 96/299 |
| 4,204,847 A * | 5/1980 | Ko | .................. | 96/356 |
| 4,276,064 A * | 6/1981 | Gerdes | .......................... | 96/239 |
| 4,755,194 A | 7/1988 | Rooker et al. | | |
| 5,185,017 A * | 2/1993 | Tanigawa et al. | ............... | 96/356 |
| 5,201,919 A * | 4/1993 | Jahn et al. | ........................ | 96/262 |
| 5,230,725 A * | 7/1993 | Chowaniec | ..................... | 55/440 |
| 5,464,459 A * | 11/1995 | VanBuskirk et al. | ........... | 96/356 |
| 6,565,625 B2 * | 5/2003 | Hearld | ............................. | 95/14 |
| 7,424,999 B2 * | 9/2008 | Xu et al. | ......................... | 261/97 |
| 7,833,298 B2 * | 11/2010 | Larnholm et al. | ............. | 55/337 |
| 2003/0000390 A1 * | 1/2003 | Yuan | ............................... | 96/357 |
| 2003/0075046 A1 * | 4/2003 | Lenzing | ......................... | 95/267 |
| 2003/0143129 A1 | 7/2003 | Rabellino et al. | | |
| 2004/0007132 A1 * | 1/2004 | Holmes et al. | .................. | 95/272 |
| 2005/0072308 A1 * | 4/2005 | Aoyagi | ........................... | 96/235 |
| 2005/0247035 A1 | 11/2005 | Noga | | |

FOREIGN PATENT DOCUMENTS

| CN | 201333355 Y | 10/2009 |
|---|---|---|
| FI | 910740 A | 8/1992 |

* cited by examiner

*Primary Examiner* — Jason M Greene
*Assistant Examiner* — Dung H Bui
(74) *Attorney, Agent, or Firm* — Birch, Stewart, Kolasch & Birch, LLP

(57) ABSTRACT

An apparatus is provided for implementing water separation in the vacuum system of a paper machine. The apparatus includes a guiding baffle structure connected to an inlet pipe and a water trap vessel, and a droplet separation cell mounted at the mouth of an outlet pipe.

9 Claims, 3 Drawing Sheets

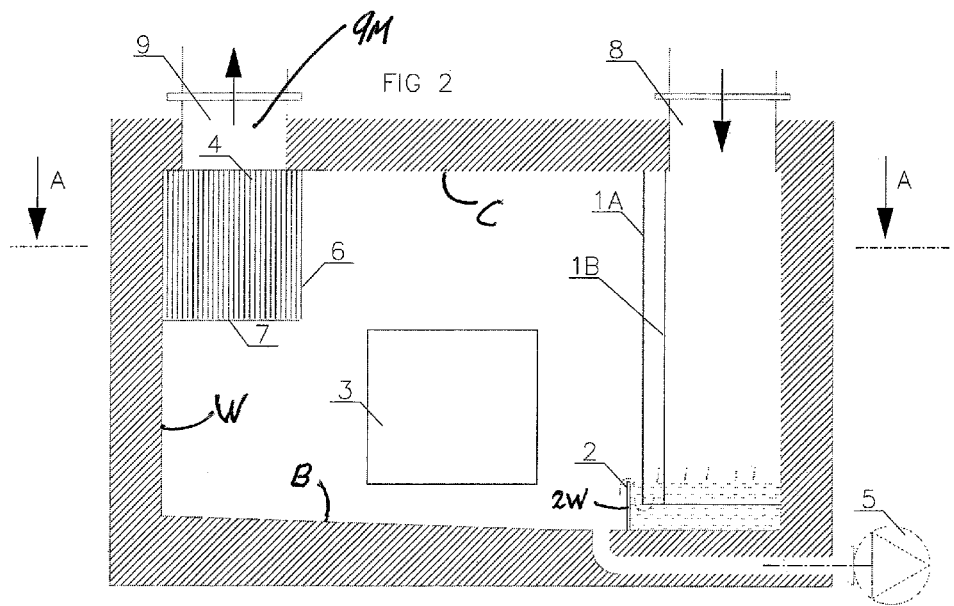
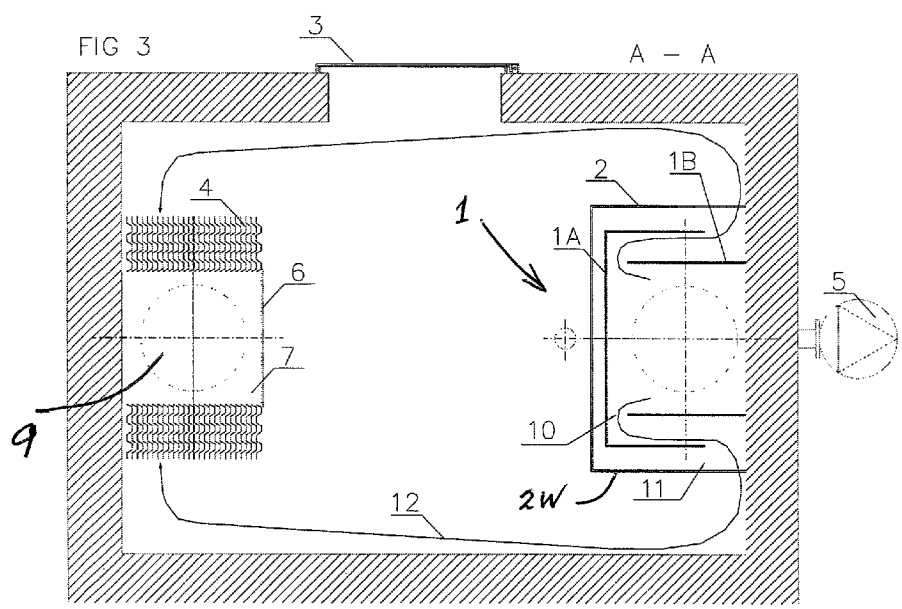

APPARATUS FOR WATER SEPARATION IN THE VACUUM SYSTEM OF A PAPER MACHINE AND METHOD FOR UTILIZING THE SAME

CROSS-REFERENCE TO RELATED APPLICATION

The present application claims priority under 35 U.S.C. §119 to Finnish Patent Application No. FI 20105361, filed Apr. 9, 2010.

BACKGROUND OF THE INVENTION

1. Field of the Invention

The invention relates to an apparatus for implementing water separation in the vacuum system of a paper machine. Furthermore, the invention relates to a method for implementing water separation in the vacuum system of a paper machine.

2. Description of Background Art

It is generally known to use vacuum for dewatering a web at the upstream end of a paper/cellulose/cardboard-making machine. The removed water must be separated from the vacuum flow prior to passing the air to a vacuum pump or blower. To this end, a steel tank has conventionally been employed wherein the flow is retarded and water is separated from air utilizing a cyclone concept. For greater air flow volumes concrete tanks have been developed in which separation of water occurs by retarding the flow velocity and then passing the air-water aerosol via droplet separation lamella plates. In the appended drawing (FIG. 1) is shown a typical concrete separation tank embodiment; this kind of construction is used by, e.g., in the structure disclosed in 1985 by the Sulzer Escher Wyss company.

In the state of the art, this construction is employed in conjunction with vacuum systems equipped with turbo blowers. In practice the system is relatively functional, but needs a lot of maintenance by the operator. A particular problem arises from the adherence of pulp to the walls of the tank structure as well as to the droplet separation lamella plates. The separation efficacy is substantially deteriorated when the lamella plates gather a layer of pulp. Resultingly, fiber can pass along with the air flow to the vacuum pump/blower. In turbo blowers the pulp fibers cling to the blade wheel that may thus become unbalanced. Pulp also adheres to the flow passageways of the blower thereby causing loss of vacuum efficacy. Moreover, in certain blower constructions pulp has penetrated into the labyrinth seals between the blade wheels thus causing damage in the blower.

It must further be noted that the prior-art construction has lamella plates located in the center of the separation tank. During system maintenance the operating personnel thereof must have access to the space behind the lamella plates for cleaning the entire tank. The lamella plate compartment must be provided with a door that can be opened during a maintenance shutdown. Cleaning the lamella plates is an extremely lengthy process and, moreover, they are expensive to fabricate.

Another disadvantage is that in practice a long piping must used to connect this kind of concrete separator tank to the blowers. As the vacuum flow takes place at 100% RH and air is cooled in the long piping, condensation occurs. Subsequently, the condensed water causes erosion in the blade wheels of the blower. These problems need be overcome.

SUMMARY AND OBJECTS OF THE INVENTION

Now the present invention offers a solution through a novel kind of apparatus that uses an improved method of water separation in a vacuum system.

The essential features of the invention are an import asset of the apparatus and the method utilizing the same as specified in the claims. More precisely, the invention is characterized by what is disclosed in the appended claims.

BRIEF DESCRIPTION OF THE DRAWINGS

The invention is next described in more detail by making reference to the annexed drawings wherein

FIG. 2 shows a preferred embodiment of a construction according to the invention;

FIG. 3 shows a sectional view of a construction according to the invention as seen from above.

DETAILED DESCRIPTION OF THE PREFERRED EMBODIMENTS

Figure 1:
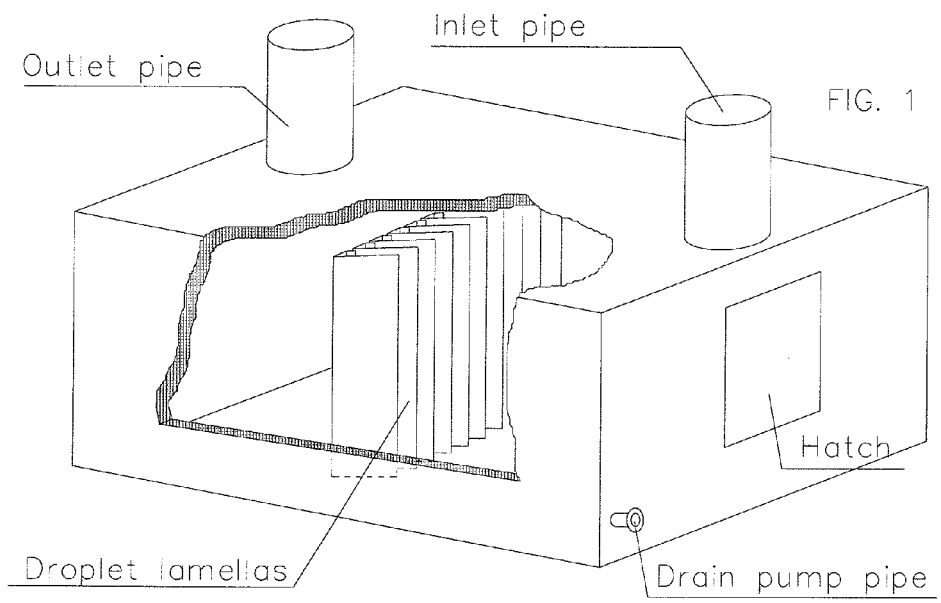
FIG. 1 shows an embodiment of a prior-art construction.

FIGS. 2 and 3 illustrate an apparatus according to the invention and a method utilizing the same. The invention discloses a novel concept capable of eliminating the disadvantages of the prior art. In FIGS. 2 and 3 the concrete separation tank T is shown in both a sectional view and viewed from above along line A-A. The separator tank T has a hatched manhole 3 suited for moving the interior structures of the tank therein. The separated water is pumped out by a discharge pump 5.

An essential feature of the invention is that the inlet pipe of the concrete separation tank is provided with a guiding baffle structure 1 that directs water and pulp to the bottom B of the separator tank T. In this pre-separator, the air flow is retarded gradually without invoking a vacuum loss. The guiding baffle structure 1 has a multisectional construction, most advantageously comprising two sections 1A and 1B displaced apart from each other by a gap 10. In gap 10 the flow cross section is twice as large as the flow cross section of inlet pipe 8. Gap 11 between section 1A and a wall 2W of the water trap vessel 2 has a flow cross section is twice as large as the flow cross section of gap 10. The retarding flow directs the water gravitationally down. On the bottom B of the pre-separator is located a water trap vessel 2 serving to prevent air flow 12 from reaching the tank bottom B. In this fashion, air flow 12 is forced to stream along the walls W and ceiling C of the separator tank T, whereby the residual water in the air flow 12 is further separated, and thereupon, flows down along the tank walls W to its bottom B.

The tank T has no lamella plates at its center, but instead, a droplet separation cell 4 is located at the mouth 9M of the outlet pipe 9. In droplet separation cells used in the art, air flows in narrow slots thus forcing the droplets to coalesce, whereupon the droplets grown in size fall gravitationally down. The cross-sectional structure of cell 4 can be fabricated using automated manufacturing techniques. According to the invention, the plates 6 and 7 of the droplet separation cell 4 are coated with PTFE or some other dirt-repelling material. When required, a small amount of clean water can be sprayed to in front of the cell. In front of the cell 4 and at the outlet pipe end are located plates 6 and 7 serving to prevent direct air flow 12 into the outlet pipe 9.

Figure 4:
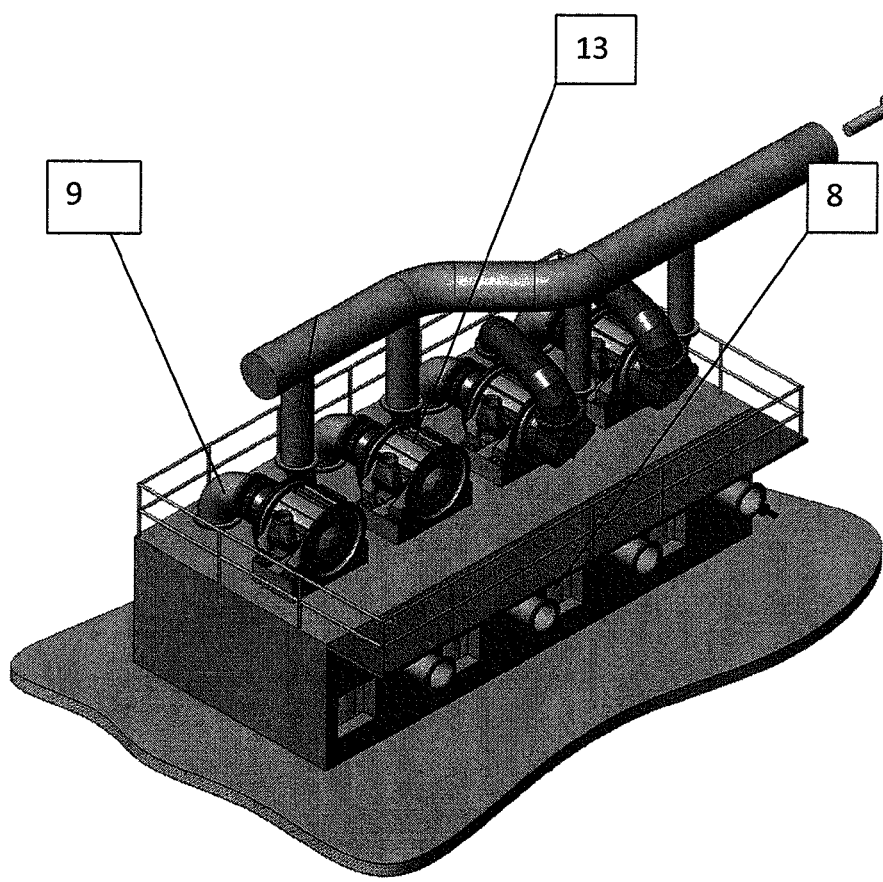
FIG. 4 shows a preferred embodiment of a construction according to the invention.

In FIG. 4 is shown a preferred embodiment of the construction according to the invention wherein four turbo blowers 13 are installed on top of the concrete separation tank T. When using lightweight blowers having the blade wheel mounted directly on the drive motor shaft, the installation can be implemented readily on the concrete separation tank T described above. This arrangement offers savings in mill footprint and piping costs. Pipe 9 is a short section between the blowers 13 and the separation tank T, most advantageous only a mere piping bend. When desired, this bend can be insulated thus entirely avoiding condensation therein. FIG. 4 represents a feasible construction showing the blower outlet pipe 9 and the blower inlet pipe 8 connected to the separation tank T.

On the basis of the above description, the invention clearly provides significant benefits. Hence, the droplet separation system according to the invention can be manufactured at a lower cost than the prior-art construction illustrated in FIG. 1; moreover, offering an improved separation efficacy and faster maintenance. It is an essential object of the present invention to ease user maintenance tasks and achieve a higher degree of separation. To the end of the invention, correct guidance of air flows in the separation tank T, particularly along the walls W thereof, is crucially important. As proven by practical test, this feature significantly enhances separation efficacy.

To a person skilled in the art it is obvious that the invention is not limited by the above-described exemplary embodiments, but rather may be varied within the inventive spirit and scope of the appended claims.

What is claimed is:

1. An apparatus for implementing water separation in a vacuum system of a paper machine, comprising:
   a guiding baffle structure connected to an inlet pipe and a water trap vessel, and
   a droplet separation cell mounted at a mouth of an outlet pipe,
   wherein the guiding baffle structure has a multi-sectional construction which includes a first section and a second section which are displaced apart from each other by a first gap.

2. The apparatus of claim 1, wherein the guiding baffle structure is constructed as a pre-separator incorporating the first gap, and a second gap between the first section and a wall of the water tap vessel of a different size for retarding an air flow gradually without causing a vacuum loss.

3. The apparatus of claim 2, wherein a flow cross section of the first gap is twice as large as a flow cross section of inlet pipe, and a flow cross section in the second gap is twice as large as the flow cross section of the first gap.

4. The apparatus of claim 1, wherein a pair of plates is located in front of the droplet separation cell and at the outlet pipe,
   wherein the plates prevent direct air flow into the outlet pipe.

5. The apparatus of claim 4, wherein the droplet separation cell is fabricated using automated manufacturing techniques and the plates of thereof are coated with PTFE or another dirt-repelling material.

6. A method for implementing water separation in the vacuum system of a paper machine, the paper machine having a separator tank being provided with a guiding baffle structure adapted to function in conjunction with an inlet pipe, a water trap vessel at a lower end of the inlet pipe, an outlet pipe, and a droplet separation cell located at a mouth of the outlet pipe,
   wherein the guiding baffle structure has a multi-sectional construction, comprising a first section and a second section which are displaced apart from each other by a first gap having a flow cross section that is twice as large as a flow cross section of the inlet pipe,
   wherein a second gap between the first section and a wall of the water tap vessel has a flow cross section that is twice as large as the flow cross section of the first gap,
   the method comprising:
   separating water and pulp falling to a bottom of the separator tank, and
   preventing an air flow from reaching the bottom of the separator tank, by guiding the air flow via the first and second gaps, and then to the outlet pipe via the droplet separation cell located at the mouth of the outlet pipe.

7. The method of claim 6, characterized in that said guiding baffle structure is a pre-separator, the method further comprising:
   retarding the air flow gradually via the first and second gaps without a vacuum loss,
   directing the water gravitationally downwardly to the bottom of the tank, and
   pumping the separated water out by a discharge pump.

8. The method of claim 6, the method further comprising:
   forcing the air flow to stream along walls and ceiling of the separator tank, and
   separating the residual water in the air flow to enable the residual water to flow down along the walls of the tank to the bottom of the tank.

9. The method of claim 6, further comprising:
   preventing the air flow from being guided directly into the outlet pipe by locating a pair of plates in front of the droplet separation cell and at the outlet pipe.

\* \* \* \* \*